United States Patent [19]

Nagaoka

[11] Patent Number: 4,947,444
[45] Date of Patent: Aug. 7, 1990

[54] IMAGE PROCESSING METHOD AND APPARATUS

[75] Inventor: Daiji Nagaoka, Kanagawa, Japan

[73] Assignee: Fuji Xerox Co., Ltd., Tokyo, Japan

[21] Appl. No.: 288,311

[22] Filed: Dec. 22, 1988

[30] Foreign Application Priority Data

Dec. 23, 1987 [JP] Japan ................................. 62-328060

[51] Int. Cl.$^5$ ................................................. G06K 9/00
[52] U.S. Cl. ............................................ 382/48; 382/5;
358/453; 358/452
[58] Field of Search ......................... 358/453, 452, 183;
382/5, 48; 340/706

[56] References Cited

U.S. PATENT DOCUMENTS

| 4,334,274 | 6/1982 | Agui et al. | 264/515 |
| 4,720,750 | 1/1988 | Watanabe | 358/453 |
| 4,811,109 | 3/1989 | Shimizu et al. | 358/453 |

FOREIGN PATENT DOCUMENTS

2105945 3/1983 United Kingdom .
2203014 10/1988 United Kingdom .

*Primary Examiner*—Leo H. Boudreau
*Assistant Examiner*—Daniel Santos
*Attorney, Agent, or Firm*—Finnegan, Henderson, Farabow, Garrett and Dunner

[57] ABSTRACT

A method and apparatus for image processing comprising the step of and means for scanning the document image having a plurality of closed regions for storing the document image in a document image memory means, detecting the outline of one of the plurality of closed regions, storing a predetermined type of editing in an area of a smearing memory means corresponding to the outline of the detected closed region, and scanning the document for reading the document image memory means synchroneously with the contents of the smearing memory means.

17 Claims, 3 Drawing Sheets

IMAGE PROCESSING METHOD AND APPARATUS

BACKGROUND OF THE INVENTION

1. Field of the Invention

The present invention relates to an image processing method and apparatus, for reading and editing the document image, and more particularly to a method and apparatus for effecting a specified type of image processing for different indicated regions in the document image.

2. Description of the Prior Art

A conventional processor normally comprises an image input unit and image output unit, such as a laser printer. The image input unit reads a document image and converts the image to an electric signal. Then, the electric image signal is subjected to various image processings. The image output unit transforms the electric image signal back into the document image.

Japanese Laid-Open Publications 60-242480 and 60-213168 disclose such an image processor wherein the document image is subjected to a partial region indication image processing, and is processed thereby differing from other region. Use of such a processor, in a copying machine, for example, subjects only the image in the indicated region to editing, such as deletion, extraction, color conversion, or back-screening.

In the prior art, to indicate a closed region to be edited, the x-y coordinates data of the region in the document image are inputted to the image processor, typically through numeral keys or a digitizer. The indication is often made by defining the coordinates of two vertices, for example, of a rectangle on a diagonal line thereof or of many points in the region of a polygon.

However, such indication has an inherent drawback in that they can not accurately indicate the region to be indicated, unless the region has a simple shape such a rectangle. For example, it would be difficult to accurately indicate a fan-shaped portion of a circular graph shown in FIG. 5. The fan-shaped portion designated with a mark "*" shown in FIG. 5(a), is rendered to processing to yield a copied image shown in FIG. 5(b). To do it in a prior art method, the coordinates of a sufficient number of sampling points for the contour or outlne of the fan-shaped portion of the circular graph to be defined, to accurately indicate the closed region to be indicated, requiring much labor. Reducing the number of sampling points will increase chances for an erroneous indication of the closed region. Furthermore, when an operator inputs the coordinates of the closed region to be indicated in the document, discrepancies between the position of the image actually read by the image input unit and the coordinates the operator inputs may occur due to mechanical and positional errors caused by erroneous positioning of the document.

SUMMARY OF THE INVENTION

An object of the present invention is to provide an image processing method and apparatus for processing an image located in the region to be edited without requiring the precise indication of the region in order to overcome the disadvantages of the prior art.

To achieve the above objects and in accordance with the purpose of the invention, as embodied and broadly described herein, an image processing apparatus of the present invention comprises: an image input means for reading an image on a document by preliminary and main scannings; a document image memory means for storing the document image read during the preliminary scanning; a means for indicating a point of editing on the document image; a setting means for detecting a closed region in the document image around the point of editing and setting to a specific state each bit in the area in a smearing memory means corresponding to the closed region of the document image, the smearing memory means being provided independently of the document image memory means; a means for reading the content stored in the smearing memory means synchronously with the reading the document image during the main scanning; and an image processing means for effecting an image processing in accordance with the content stored in the smearing memory means.

In the present invention, the preliminary scanning is effected for reading the document image to detect the closed region in the image and the main scanning for processing the image based upon the result of the detection of the closed region. In the preliminary scanning, the image signal yielded by reading the document is stored in the document image memory means. The closed region is detected around the point of editing based on the document image read during the preliminary scanning. Then the area in the smearing memory means corresponding to the detected closed region of the document image read is smeared. Each bit in the area corresponding to the closed region in the smearing memory means is set to a predetermined state. A drawing unit, having a known algorithm, effects smearing. For example, the document image memory means stores the contour or the outline of a circular graph shown in FIG. 5(a) and the smearing memory means is smeared in the area corresponding to the fan-shaped region of the circular graph. Subsequently, the main scanning is effected to read the document image again and the content in the smearing memory means synchroneously. The content in the smearing memory means corresponds to the closed region, being edited, in the document image, so that the predetermined image processing based on the information of the closed region permits the processing to be effected only for the closed region in the document image.

The accompanying drawings, which are incorporated in an constitute a part of this specification, illustrate one embodiment of the invention and together with the description, serve to explain the principles of the invention.

BRIEF DESCRIPTION OF THE DRAWINGS

FIG. 4(c) is a graphic representation of a bit pattern stored in the second smearing bit map memory, according to the present invention.

FIG. 4(d) is a graphic presentation of a bit pattern stored in the third smearing bit map memory, according to the present invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
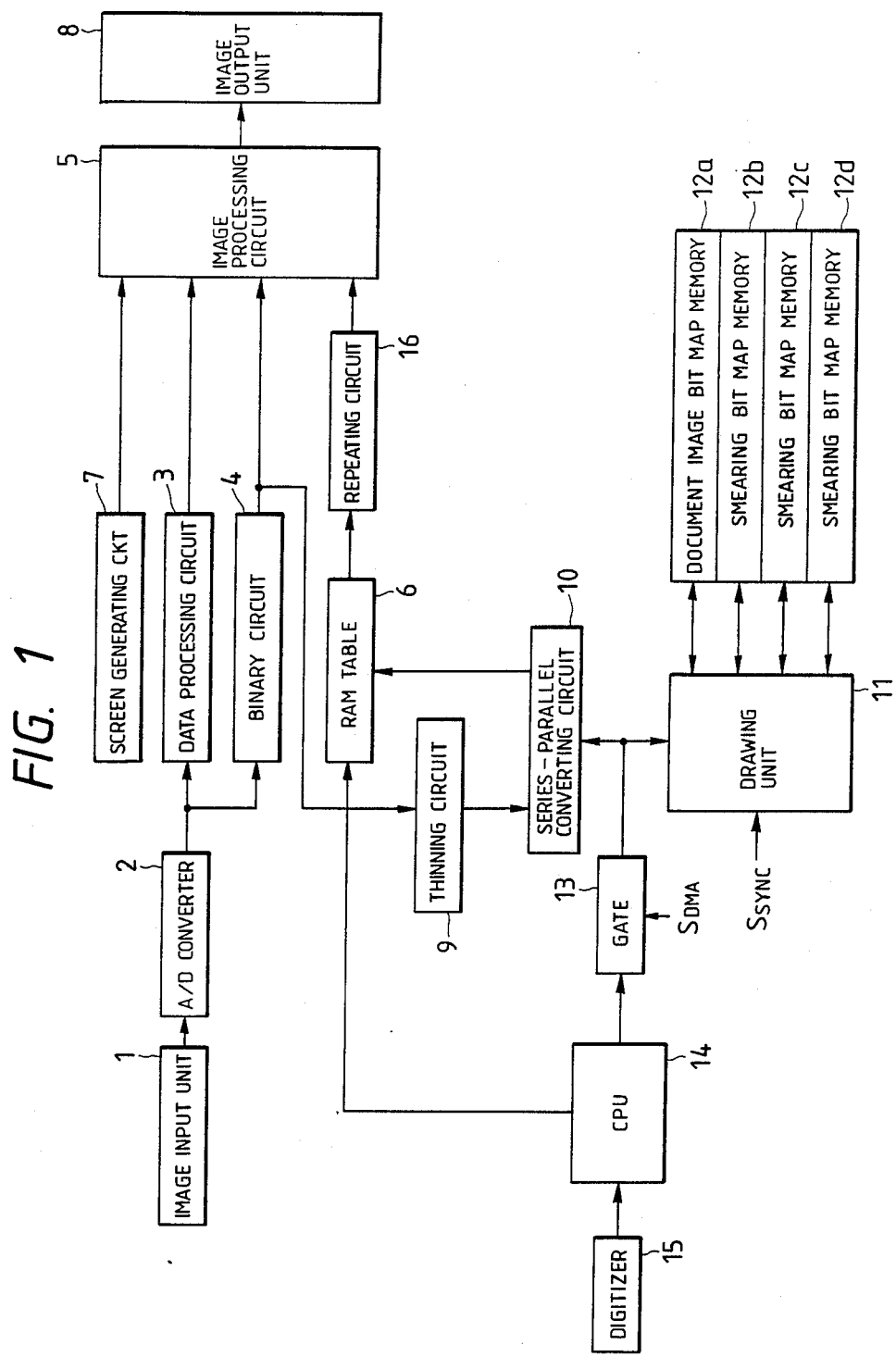
FIG. 1 is a schematic block diagram of an image processing apparatus, according to an embodiment of the present invention.

FIG. 1 shows an image processing apparatus, which is an embodiment of the present invention. An image input unit 1 is provided for reading a document image.

Figure 2:
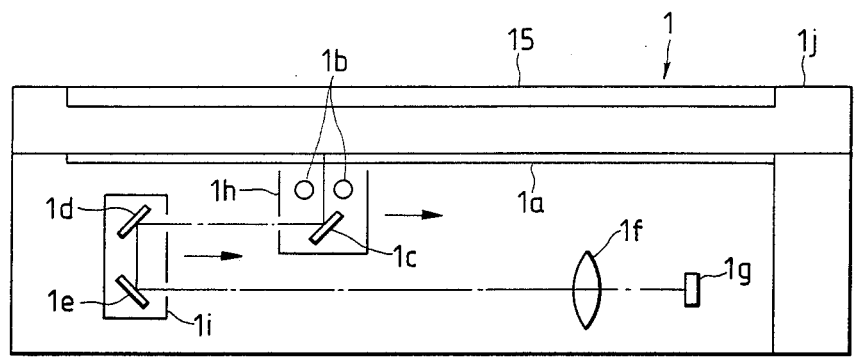
FIG. 2 is a cross sectional view of an image input unit.

FIG. 2 shows a detailed construction of image input until 1 where a document is placed on a platen glass 1a and light sources 1b projects light to the document. The lights reflected from the document travel through reflecting mirrors 1c, 1d and 1e and focused by a lens 1f before reaching an image sensor 1g to yield an image signal. Light sources 1b and reflecting mirror 1c are mounted on a full-speed carriage 1h and reflecting mirrors 1d and 1e are mounted on a half-speed carriage 1i. Full-speed carriage 1h is moved in the direction of an arrow shown in FIG. 2, along the bottom surface of platen glass 1a, while half-speed carriage 1i is moved in the same direction at a speed half of that of full-speed carriage 1h, thereby reading the document image with a resolution of approximately 16 dots/mm or 400 dots/inch.

In FIG. 1, the image signal from image input unit 1 is converted to a digital signal by an A/D converter. A half tone image, such as a photograph image is sent via a binary circuit 4. A RAM (Random Access Memory) Table 6, connected to image processing circuit 5 stores function codes indicating the type of processing needed, such as deletion, extraction, color conversion, and back-screening. RAM Table 6 effects each processing to be performed in conformity with the function code. A screen generating circuit 7 is provided to generate a screen pattern for back-screen. The image signal processed in image processing circuit 5 is sent to an image output unit 8, such as a laser printer, etc. Then, the document image, which has been edited, is finally copied.

The image signal from binary circuit 4 is sent via a thinning circuit 9 and a serial-parallel converting circuit 10 to a drawing unit 11. Drawing unit 11 writes the document image to a document image bit map memory 12a. Drawing unit 11 proves a high speed write operation for bit map memories 12a and 12d, for which a CRTC (cathode-ray tube controller), e.g., an integrated circuit for drawing such as HD 63484 available from Hitachi, Ltd., is employed.

Drawing unit 11 is to effect the drawing of a straight line, and the smearing of a closed region in the bit map memory, with a known algorithm, by inputting thereinto the coordinate data and the type of processing to be performed. The smearing of the closed region means that each bit in the bit map memory corresponding to the closed region is set to a particular state, e.g., "1".

Drawing unit 11 is connected via a gate 13 to a central processing unit (CPU) 14. Gate 13 is closed during scanning by image input unit 1 and open otherwise.

CPU 14 is to effect the writing of the function code into RAM Table 6 as well as the control of drawing unit 11. More specifically, CPU 14 updates the content of RAM Table 6 on an instruction from a digitizer 15, and provides drawing until 11 with an indication as to which one of first, second, and third smearing bit map memories, 12b, 12c, and 12d should be smeared. RAM Table 6 sends its output, via a repeating circuit 16, to image processing circuit 5.

Figure 3:
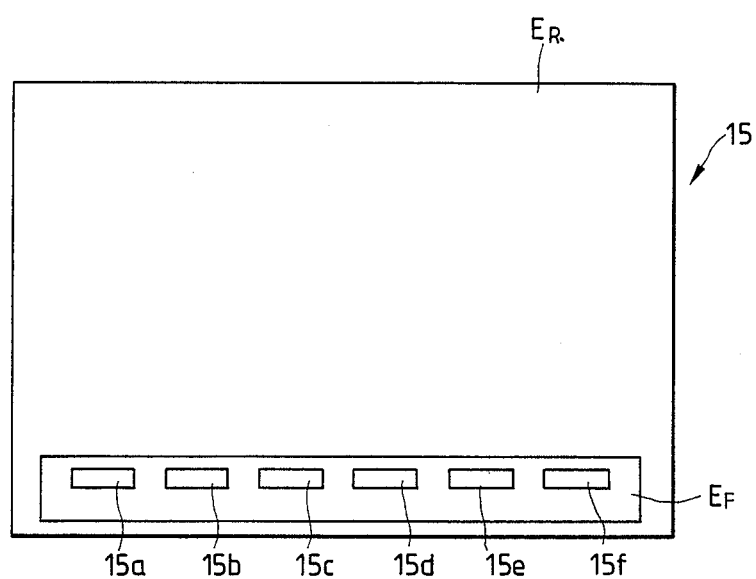
FIG. 3 is a top-down view of a digitizer, according to the present invention.

In FIG. 3, a digitizer 15 has a flat top surface of A3-size, comprising a region-designating area $E_R$, for designatng a region to be edited, and function-designating area $E_F$ for designating a type of processing. CPU 14 processes the coordinates data as a region information when a position in region-designating area $E_r$ is depressed and as a function information when one of windows 15a–15 f in function-designating area $E_F$ is depressed.

In FIG. 2, digitizer 15 is disposed on the upper surface of a platen cover 1j and a platen glass 1a of image input unit 1 on the lower surface of the platen cover, which can be easily opened or closed.

Figure 5A:
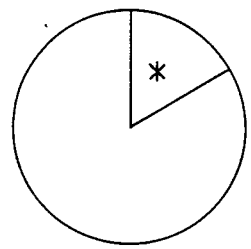
FIG. 5(a) is a graphic representation of a document image before being subjected to an information processing.
Figure 5B:
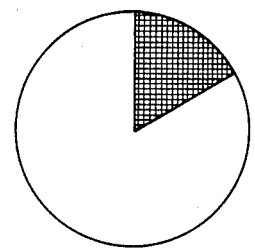
FIG. 5(b) is a graphic representation of a document image after being subjected to an information processing.

The operation of the image processor will be described in detail with reference to the drawings. FIG. 5(a) show an image of the document before being subjected to an image processing and FIG. 5(b) after being subjected to an image processing.

This document to be edited or to be subjected to image processing is first placed on region-designating area $E_R$ shown in FIG. 3 of digitizer 15, and a point in the closed region to be edited is indicated. The coordinates data of the indicated point is sent to CPU 14 and stored therein as the coordinates data indicating the point of smearing or editing. This point, requiring no precise or accurate definition, may be located anywhere in the closed region to be edited, thus facilitating the indication manipulation.

Then, platent cover 1j is opened, the document is placed on platen glass 1a of image input unit 1, subsequently platent cover 1j is closed. A scanning optical system, having light sources 1b and mirrors 1c, 1d and 1e, is provided in image input unit 1 and moved to start to scan the image on the document. This process is called a preliminary scanning.

Figure 4A:
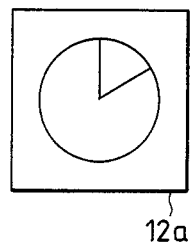
FIG. 4(a) is a graphic representation of a bit pattern stored in the document bit map memory, according to the present invention.

As shown in FIG. 1, the image signal obtained from image input unit 1 during the preliminary scanning is sent, via a A/D converter 2, a binary circuit 4, a thinning circuit 9, and a series-parallel converting circuit 10, to a drawing unit 11. Drawing unit 11 writes the image signal into a document image bit map memory 12a. A bit pattern is formed corresponding to the document image as shown in FIG. 4(a). This write operation is executed in a direct memory access (DMA) mode. That DMA mode operates during the preliminary scanning, for a high speed access to the associated memories, wherein gate 13 is closed by a DMA control signal, produced synchronously with the document scanning, to isolate drawing unit 11 from CPU 14. A DMA controller (not shown) accesses directly to bit map memories 12a, 12b, 12c, and 12d for read and write operation without being affected by CPU 14. The DMA mode operates also during the main scanning, which is described below.

In the present embodiment, the image signal from image input unit 1 is thinned or compressed to ¼ of the original image both vertically and horizontally by a thinning circuit 9. The image data thinned to 1/16 of the original image in size is stored in document image bit map memory 12a. Such thinning reduces the memory capacity requirement and thus the cost of the associated memory. Document image bit map memory 12a may have its resolution less than that of image input unit 1, approximately 4 dots/mm (100 dots/inch). The document image is detected in the image unit of 4×4 picture elements, and the entire image unit is stored in document image bit map memory 12a as black even if only one of the 16 picture elements in the unit is black. The document image is thus assured a continuity in the contour and a simple sampling would not disrupt the discontinuity or make it impossible to indicate a closed region. Gate 13 is closed when the preliminary scanning is completed. Then, CPU 14 instructs, via gate 13, drawing unit 11 to smear the closed region of the document image. Drawing unit 11, upon receiving the instructions from CPU 14, detects the closed region, around the coordinates indicated by digitizer 15, of the document image stored in document image bit map memory 12a to smear the areas in smearing bit map memories 12b, 12c, and 12d corresponding to the closed region. The areas in these smearing bit map memories are smeared in a specific combination in conformity with the type of processing indicated by digitizer 15. These areas correspond to the region to be processed in image processing circuit 5.

The present embodiment employs three smearing bit map memories 12b, 12c, and 12d, which permit $2^3$ states as shown in Table 1, i.e., 8 processings or editings including no processing or editing. In Table 1, "1" indicates smearing while "0" indicating no smearing.

TABLE 1

| Function Nos. | Smearing Bit Map Memories | | | Type of Processing |
|---|---|---|---|---|
| | 12b | 12c | 12d | |
| 0 | 0 | 0 | 0 | no processing |
| 1 | 0 | 0 | 1 | deletion |
| 2 | 0 | 1 | 0 | extraction |
| 3 | 0 | 1 | 1 | color conversion |
| 4 | 1 | 0 | 0 | back screening |
| 5 | 1 | 0 | 1 | ... |
| 6 | 1 | 1 | 0 | ... |
| 7 | 1 | 1 | 1 | ... |

Figure 4B:
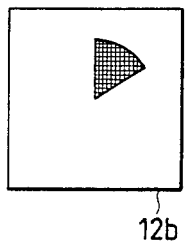
FIG. 4(b) is a graphic representation of a bit pattern stored in the first smearing bit may memory, according to the present invention.

When, for example, the type of processing is back screening, only smearing bit map memory 12b is smeared and smearing bit map memories 12c and 12d are not, as shown in FIGS. 4(b), 4(c) and 4(d).

CPU 14 provides function codes to RAM Table 6. Correspondence between the function code and the type of processing listed in Table 1 is changeable: CPU 14 can instruct a different set of combinations from those listed in Table 1. For example, the 8 bit function code used in an actual instruction to image processing circuit 5 allows 256 types of processing to be set. Accordingly, updating the content in RAM Table 6 permits a simultaneous indication of 7 arbitrary types of processing.

Image input unit 1 executes the main scanning for reading the document image again, and operates drawing unit 11 synchronously with a synchronizing signal $S_{SYNC}$, produced by reading the document image. Drawing unit 11 thereby reads, in the bit unit, the bit patterns stored in smearing bit map memories 12b, 12c, and 12d and passes the patterns to RAM Table 6 as a 3 bit address signal, via a series-parallel converting cicuit 10.

RAM Table 6 includes an information of the correspondence between the function numbers indicating the type of the processing and the function codes previously written therein by CPU 14. RAM Table 6 allows the function codes to be read in the bit unit corresponding to the smeared area of smearing bit map memories 12b, 12c, and 12d.

In the present embodiment, the data stored in the regions in smearing bit map memories 12b, 12c, 12d have been thinned to ¼ of the original image vertically and horizontally, and repeating circuit 16 repeats, upon reading the same data four times vertically and horizontally to assure the correspondence between the document image and the edited region.

Image processing circuit 5 executes a processing corresponding to the function code sent from repeating circuit 16, and processes the image signal fed from either processing circuit 3 or binary circuit 4. When the type of processing is back screening, image processing circuit 5 uses a screening signal from screen generating circuit 7. The image signal after being processed is sent to image output unit 8 to provide the output image shown in FIG. 5(b).

It will be apparent to those skilled in the art that various modifications and variations can be made in the image processing apparatus of the present invention and in construction of this image processng apparatus without departing from the scope or spirit of the invention. As an example, in the above embodiment an integrated circuit was employed for drawing unit 11. Any alternate device capable of high speed operation can be employed instead, for read/write from/into bit map memories 12a–12d.

Furthermore, although in the above embodiment the smearing of the fan-shaped portion of the circular graph is used as an example, the invention is applicable to any other picture shape or form of the image such as bar graphs or the like without limitation, provided that the region to be edited is a closed region.

According to the present invention, the closed region of the document image is detected to smear the corresponding area in the smearing memory means, and subsequently the image processing is effected corresponding to the smeared area. Provided the region to be edited is a closed one, the image located in the indicated region is processed irrespective of its shape. This saves the trouble of providing the coordinates of many points on the contour of the region, as required in the prior art, to accurately indicate the region. For example, the method and apparatus of the present invention can greatly facilitate image processing for a predetermined region in a circular graph. Moreover, the indication of the region to be edited can be accurately indicated by simply indicating any point in the region, thus facilitating the region indication manipulation.

What is claimed is:

1. A method of image processing, comprising:
   scanning the document image having a plurality of closed regions for storing the document image in a document image memory means;
   detecting the outline of one of the plurality of closed regions stored in the document image memory means;
   storing a predetermined type of editing in an area of a smearing memory means corresponding to the outline of the detected close region, said storing step including smearing the area of the smearing memory means corresponding to the outline of the detected closed region; and scanning the document for reading the document image from the document image memory means synchronously with the contents of the smearing memory means.

2. A method of image processing according to claim 1, further comprising the step of processing the document image in accordance with the contents of the smearing memory means.

3. A method of image processing according to claim 1, further comprising the step of indicating one of said plurality of closed regions to be edited.

4. A method of image processing according to claim 3, wherein the step of indicating one of said plurality of closed regions include the substep of identifying a point inside one of the plurality of closed regions.

5. A method of image processing according to claim 4, wherein the step of identifying a point inside one of the plurality of closed regions includes the substep of placing the document in a region-designated area disposed in a digitizer and then selecting a point inside one of the plurality of closed regions in the document placed therein.

6. A method of image processing according to claim 1, further comprising the step of selecting one of plurality of predetermined types of editing.

7. A method of image processing according to claim 6, wherein the step of selecting one of plurality of predetermined types of editing includes the substep of selecting the predetermined type of editing in a function-designating area disposed in a digitizer.

8. Apparatus for image processing, comprising:
input means for scanning the document image having a plurality of closed regions;
document image memory means for storing the document image;
means for detecting the outline of one of the plurality of closed regions stored in said document image memory means;
means for storing a predetermined type of editing in an area of a smearing memory means correponding to the contour of the detected closed region, said storing means including means for smearing the area of the smearing memory means corresponding to the outline of the detected closed region; and means for scanning the document for reading the document image from the document image memory means synchronously with the contents of the smearing memory means.

9. Appartus for image processing according to claim 8, wherein said means for smearing the area of the smearing memory means include a drawing means having a predetermined algorithm cooperating with the document memory means for drawing straight lines in the area of the smear memory means corresponding to the detected closed region.

10. Apparatus for image processing according to claim 8, further comprising image processing means cooperating with said input means for scanning the document image and the smearing memory means for processing the document image in accordance with the contents of the smear memory means.

11. Apparatus for image processing according to claim 8, further comprising means for indicating one of the plurality of closed regions to be edited.

12. Apparatus for image processing according to claim 11, wherein said means for indicating one of the plurality of closed regions include means for identifying a point inside one of the plurality of closed regions.

13. Apparatus for image processing according to claim 12, wherein said means for identifying a point inside one of the plurality of closed regions include means for placing the document in a region-designating area disposed in a digitizer and then selectin a point inside one of the plurality of closed regions in the document placed therein.

14. Apparatus for image processing according to claim 13, wherein said digitizer is disposed integratedly in the upper surface of said input means for scanning the document image.

15. Apparatus for image processing according to claim 8, further comprising means for selecting one of plurality of predetermined types of editing.

16. Apparatus for image processing according to claim 15, wherein said means for selecting one of a plurality of predetermined types of editing includes means for identifying for predetermined type of editing in a function designating area disposed in a digitizer.

17. Apparatus for image processing according to claim 16, wherein said digitizer is disposed integrated on the upper surface of said input means for scanning the document image.

* * * * *